US008654905B2

(12) United States Patent
Lee et al.

(10) Patent No.: US 8,654,905 B2
(45) Date of Patent: Feb. 18, 2014

(54) METHOD AND APPARATUS FOR CANCELING INTERFERENCE

(75) Inventors: Hoon Lee, Daejeon (KR); Chang Wahn Yu, Daejeon (KR); Youn Ok Park, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 785 days.

(21) Appl. No.: 12/204,464

(22) Filed: Sep. 4, 2008

(65) Prior Publication Data

US 2009/0147892 A1 Jun. 11, 2009

(30) Foreign Application Priority Data

Dec. 6, 2007 (KR) ........................ 10-2007-0126063

(51) Int. Cl.
*H04B 1/10* (2006.01)
(52) U.S. Cl.
USPC .......................................... 375/346; 375/316
(58) Field of Classification Search
USPC .................................. 375/346, 316
See application file for complete search history.

(56) References Cited

U.S. PATENT DOCUMENTS

| 6,973,134 | B1 | 12/2005 | Jones, IV et al. | |
| 2002/0196841 | A1* | 12/2002 | Karna | 375/147 |
| 2004/0165675 | A1* | 8/2004 | Ito et al. | 375/267 |
| 2005/0149843 | A1* | 7/2005 | Shen et al. | 714/800 |
| 2005/0201268 | A1* | 9/2005 | Aoki et al. | 370/208 |
| 2006/0285585 | A1* | 12/2006 | Sampath | 375/227 |
| 2007/0165755 | A1 | 7/2007 | Jong | |
| 2008/0181323 | A1* | 7/2008 | Waters et al. | 375/260 |
| 2008/0292013 | A1* | 11/2008 | Varadarajan et al. | 375/260 |

FOREIGN PATENT DOCUMENTS

| JP | 2003-234718 A | 8/2003 |
| KR | 10-2007-0075942 A | 7/2007 |
| WO | 2006/138621 A2 | 12/2006 |

* cited by examiner

*Primary Examiner* — Michael Neff
(74) *Attorney, Agent, or Firm* — Jefferson IP Law, LLP

(57) ABSTRACT

An apparatus for canceling interference includes a plurality of converters, a plurality of interference cancellation units, a plurality of variance detectors, and an output selecting unit. The plurality of converters converts a plurality of received signals to a plurality of frequency domain signals, respectively. The plurality of interference cancellation units cancel interference in the plurality of frequency domain signals using a plurality of interference cancellation schemes to generate a plurality of interference-canceled signals corresponding to the plurality of interference cancellation schemes, respectively. The plurality of variance detectors measure a plurality of amounts of residual interference corresponding to the plurality of interference-canceled signals, respectively. The output selecting unit selects a single interference-canceled signal with the least amount of residual interference from the plurality of interference-canceled signals, based on the plurality of amounts of residual interference.

7 Claims, 4 Drawing Sheets

METHOD AND APPARATUS FOR CANCELING INTERFERENCE

CROSS-REFERENCE TO RELATED APPLICATION

This application claims priority to and the benefit of Korean Patent Application No. 10-2007-0126063 filed in the Korean Intellectual Property Office on Dec. 6, 2007, the entire contents of which are incorporated herein by reference.

BACKGROUND OF THE INVENTION (a) Field of the Invention

The present invention relates to a method and apparatus for canceling interference. Particularly, the present invention relates to a method and apparatus for canceling interference that is adaptive to environments in an orthogonal frequency division multiplexing (OFDM) wireless transmission system.

(b) Description of the Related Art

In an orthogonal frequency division multiplexing (OFDM) wireless transmission system, when a frequency reuse factor is 1, interference coming from downstream transmission signals due to transmission signals from a base station of a neighbor cell generally causes performance degradation of the system. An apparatus for canceling interference provides smooth handover even when the magnitude of interference is greater than the magnitude of a desired signal in the edge of the cell.

Generally, various types of schemes can be used for interference cancellation. An interference cancellation scheme adopts a plurality of antennas at a receiver and estimates the same number of independent channels as the number of receiving antennas and an interference channel from the result that a signal transmitted via a single transmit antenna is received at different receiving antennas, thereby removing the interference in the received signal. In this instance, a pilot signal or a preamble corresponding to a known signal pattern between a transmitter and the receiver is used for estimation of the signal and the interference channel. The interference cancellation performance is determined according to a scheme of disposing the preamble or the pilot signal, and estimating the channel and the interference channel using the same.

Among various interference cancellation schemes, a maximal ratio combining (MRC) scheme regards interference as noise and then increases a signal-to-noise ratio (SNR), instead of estimating the interference channel.

When the receiver uses a single antenna, a least squares (LS) scheme, among the interference cancellation schemes, regards as if iteratively received MAP data is received via the same subcarrier and different antennas, based on the fact that the MAP data of an Institute of Electrical and Electronics Engineers (IEEE) 802.16e frame is iteratively transmitted over different subcarriers or time. Next, the LS scheme estimates a signal and an interference channel to cancel the interference using the estimation result.

However, since the MRC scheme and the LS scheme cancel the interference using a single scheme, the performance for interference cancellation may be different depending on the number of interferences and the magnitude thereof. Accordingly, it may be difficult to expect optimal interference cancellation using a single interference cancellation unit in real environments.

SUMMARY OF THE INVENTION

The present invention has been made in an effort to provide a method and apparatus for canceling interference that can provide optimal performance for interference cancellation in an interference environment.

An exemplary embodiment of the present invention provides a method of canceling interference. The method includes: converting a plurality of received signals to a plurality of frequency domain signals, respectively; canceling interference in the plurality of frequency domain signals using a plurality of interference cancellation schemes to generate a plurality of interference-canceled signals corresponding to the plurality of interference cancellation schemes, respectively; measuring a plurality of amounts of residual interference corresponding to the plurality of interference-canceled signals, respectively; and selecting a single interference-canceled signal with the least amount of residual interference from the plurality of interference-canceled signals, based on the plurality of amounts of residual interference.

Another embodiment of the present invention provides an apparatus for selecting an interference cancellation scheme. The apparatus includes: a plurality of converters converting a plurality of received signals to a plurality of frequency domain signals, respectively; a plurality of interference cancellation units canceling interference in the plurality of frequency domain signals using a plurality of interference cancellation schemes to generate a plurality of interference-canceled signals corresponding to the plurality of interference cancellation schemes, respectively; a plurality of variance detectors measuring a plurality of amounts of residual interference corresponding to the plurality of interference-canceled signals, respectively; and an output selecting unit selecting a single interference-canceled signal with the least amount of residual interference from the plurality of interference-canceled signals, based on the plurality of amounts of residual interference.

DETAILED DESCRIPTION OF THE EMBODIMENTS

Figure 1:
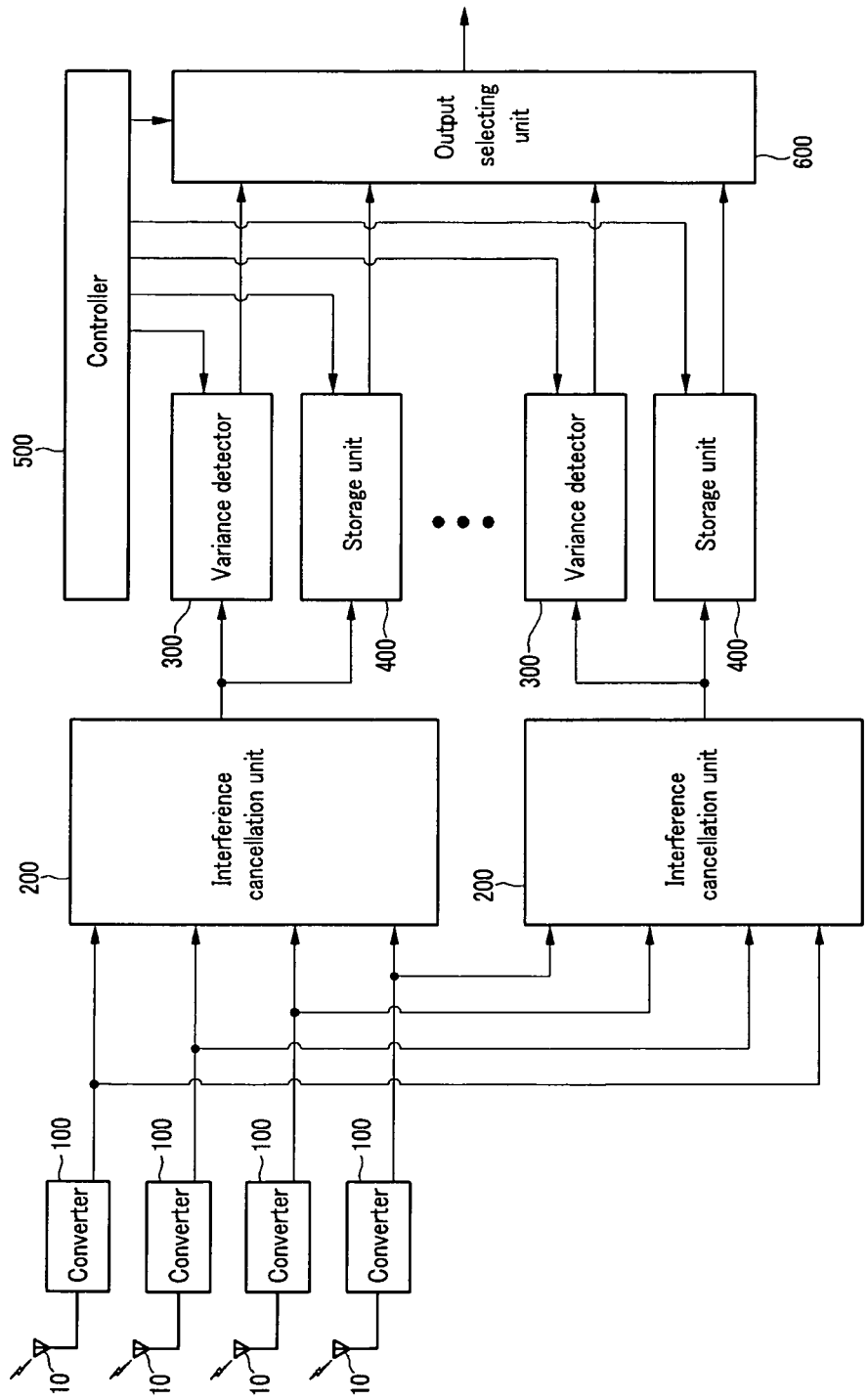
FIG. 1 is a block diagram illustrating a configuration of an apparatus for canceling interference according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

FIG. 1 is a block diagram illustrating a configuration of an apparatus for canceling interference according to an exemplary embodiment of the present invention.

As shown in FIG. 1, the apparatus for canceling interference includes a plurality of antennas 10, a plurality of converters 100, a plurality of interference cancellation units 200, a plurality of variance detectors 300, a plurality of storage units 400, a controller 500, and an output selecting unit 600.

Hereinafter, a method of canceling interference according to an exemplary embodiment of the present invention will be described in detail with reference to FIG. 2.

Figure 2:
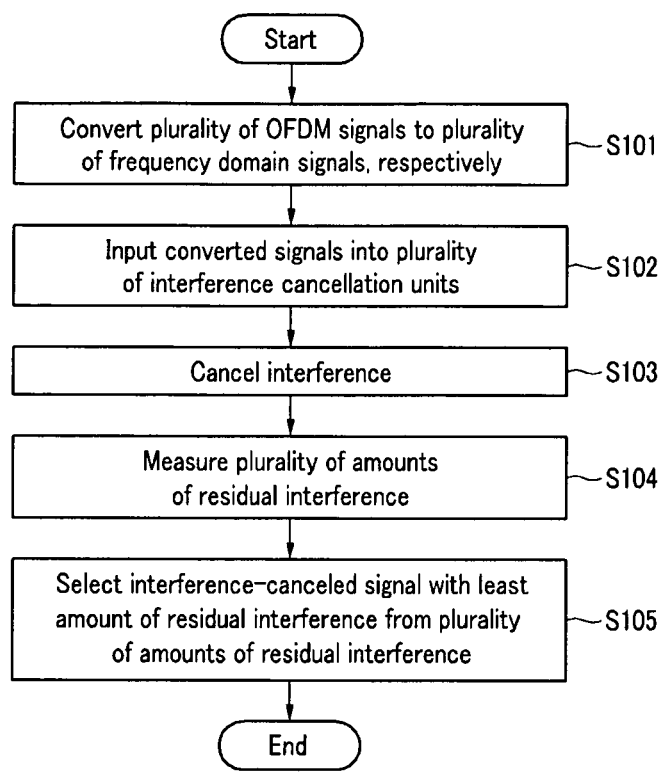
FIG. 2 is flowchart illustrating a method of canceling interference according to an exemplary embodiment of the present invention.

FIG. 2 is flowchart illustrating a method of canceling interference according to an exemplary embodiment of the present invention.

Initially, the plurality of converters 100 receive a plurality of orthogonal frequency division multiplexing (OFDM) signals via the plurality of antennas 10. The plurality of converters 100 convert the plurality of OFDM signals to a plurality of frequency domain signals using fast Fourier transform (FFT) (S101). In this instance, the entire frequency bandwidth is divided into k subcarrier bands. K subcarriers correspond to a single unit for performing FFT or inverse fast Fourier transform (IFFT), and include a quadrature amplitude modulation (QAM) symbol. In this instance, the subcarriers are transmitted based on the OFDM symbol unit, on the temporal axis. Concerning the correlation between one symbol and another subsequently transmitted symbol, a channel and interference changes over time, which results in different interference. Also, interference occurs in signals of a neighboring cell using the same frequency bandwidth.

The plurality of converters 100 transmits the plurality of frequency domain signals to the plurality of interference cancellation units 200 (S102). The plurality of interference cancellation units 200 cancel interference in the plurality of frequency domain signals using a plurality of interference cancellation schemes to generate a plurality of interference-canceled signals corresponding to the plurality of interference cancellation schemes, respectively (S103). Also, output signals of the plurality of interference cancellation units 200 are transmitted to the plurality of variance detectors 300 and the plurality of storage units 400 corresponding to the plurality of interference cancellation units, respectively.

The plurality of variance detectors 300 measures a plurality of amounts of residual interference corresponding to the plurality of interference-canceled signals, respectively (S104). While calculating the plurality of amounts of residual interference, the plurality of storage units 400 store outputs from the plurality of interference cancellation units 200.

The output selecting unit 600 receives the plurality of amounts of residual interference from the plurality of variance detectors 300 to select a single interference-canceled signal with the least amount of residual interference, and then selects and outputs a corresponding signal from the plurality of storage units 400 (S105).

The controller 500 according to an exemplary embodiment of the present invention controls the operation of calculating the variance for evaluating the performance of the plurality of interference cancellation units 200, based on the OFDM symbol unit. Also, the controller 500 inputs an OFDM symbol to each of the plurality of variance detectors 300 and then provides a reset signal to control the variance calculation of the OFDM symbol unit. Also, the controller 500 controls the plurality of storage units 400 to buffer data based on the OFDM symbol unit, and controls the output selecting unit 600 to select a single interference-canceled signal based on the OFDM symbol unit.

The controller 500 according to an exemplary embodiment of the present invention may provide control signals to the plurality of variance detectors 300, the plurality of storage units 400, and the output selection unit 600. Here, the control signals are based on a subcarrier group unit in addition to the OFDM symbol unit. When a radio transmission channel environment significantly varies according to frequency, the controller 500 controls an interference cancellation scheme to be selected based on an adjacent subcarrier group unit.

Hereinafter, one of the plurality of variance detectors 300 according to an exemplary embodiment of the present invention will be described in detail with reference to FIGS. 3 and 4.

Figure 3:
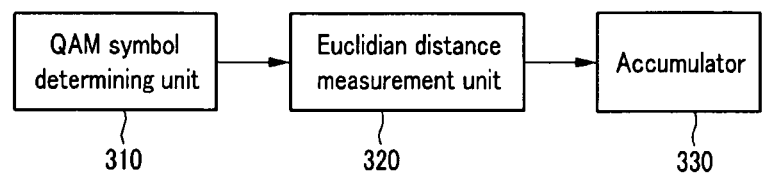
FIG. 3 is a block diagram illustrating a configuration of a variance detector according to an exemplary embodiment of the present invention.

FIG. 3 is a block diagram illustrating a configuration of a variance detector according to an exemplary embodiment of the present invention.

As shown in FIG. 3, the variance detector includes a QAM symbol determining unit 310, a Euclidian distance measurement unit 320, and an accumulator 330.

Hereinafter, a method of measuring the amount of residual interference according to an exemplary embodiment of the present invention will be described in detail with reference to FIG. 4.

Figure 4:
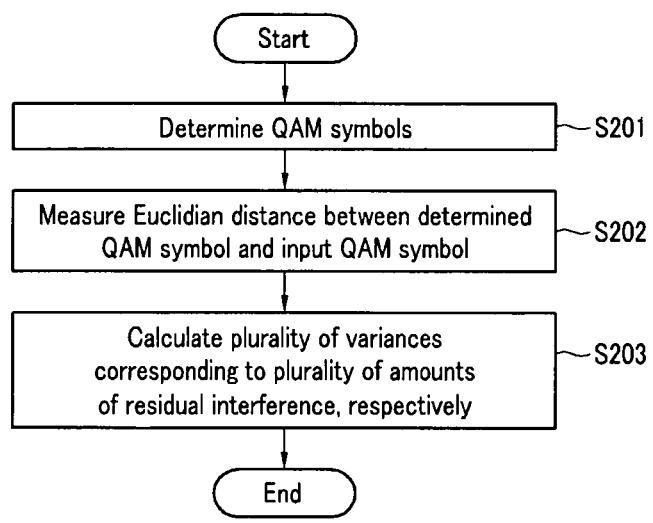
FIG. 4 is a flowchart illustrating a method of measuring the amount of residual interference according to an exemplary embodiment of the present invention.

FIG. 4 is a flowchart illustrating a method of measuring the amount of residual interference according to an exemplary embodiment of the present invention.

The QAM symbol determining unit 310 receives a plurality of OFDM signals of the frequency axis in which interference is cancelled to determine a QAM symbol corresponding to a plurality of subcarriers of each interference-canceled signal (S201).

The Euclidian distance measurement unit 320 obtains the Euclidian distance between the determined QAM symbol corresponding to the plurality of subcarriers and a plurality of QAM symbols, using the square of an absolute value of the difference between the plurality of subcarriers and the plurality of QAM symbols (S202).

The accumulator 330 calculates a plurality of variances corresponding to the plurality of amounts of residual interference, respectively, based on the difference between the plurality of subcarriers and the plurality of QAM symbols (S203). Also, the accumulator 330 accumulates the plurality of variances based on the QAM symbol unit. When calculating the actual variance, the average of input symbols needs to be calculated. However, since the average of QAM symbols is zero, the variance is calculated simply. Also, the accumulated variances are reset by a control signal of the controller 500.

As described above, a method and apparatus for canceling interference according to exemplary embodiments of the present invention may provide optimal performance for interference cancellation at all times, regardless of a change of interference in environments.

The above-mentioned exemplary embodiments of the present invention are not embodied only by a method and apparatus. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for canceling interference, the method comprising:
    converting a plurality of received signals to a plurality of frequency domain signals, respectively;
    canceling interference in the plurality of frequency domain signals using a plurality of different interference cancellation schemes to generate a plurality of interference-canceled signals respectively corresponding to the plurality of different interference cancellation schemes, respectively;
    measuring a plurality of amounts of residual interference corresponding to the plurality of interference-canceled signals, respectively;
    selecting a single interference-canceled signal with a least amount of residual interference from the plurality of interference-canceled signals, based on the plurality of amounts of residual interference; and
    storing the plurality of interference-canceled signals generated using the plurality of different interference cancellation schemes while measuring the plurality of amounts of residual interference.

2. The method of claim 1, wherein the measuring the plurality of amounts of residual interference comprises:
    obtaining a plurality of digital demodulation symbols corresponding to a plurality of subcarriers of each of the plurality of interference-canceled signals, respectively; and
    calculating a plurality of variances corresponding to the plurality of amounts of residual interference, respectively, based on differences between the plurality of subcarriers and the plurality of digital demodulation symbols.

3. The method of claim 1, wherein the selecting of the single interference-canceled signal comprises selecting the single interference-canceled signal based on an orthogonal frequency division multiplexing (OFDM) symbol unit.

4. The method of claim 1, wherein the converting of the plurality of received signals to the plurality of frequency domain signals further comprises receiving the plurality of received signals via a plurality of antennas, respectively.

5. An apparatus for selecting an interference cancellation scheme, the apparatus comprising:
    a plurality of converters converting a plurality of received signals to a plurality of frequency domain signals, respectively;
    a plurality of interference cancellation units canceling interference in the plurality of frequency domain signals using a plurality of different interference cancellation schemes, to generate a plurality of interference-canceled signals respectively corresponding to the plurality of different interference cancellation schemes, respectively;
    a plurality of variance detectors measuring a plurality of amounts of residual interference corresponding to the plurality of interference-canceled signals, respectively;
    an output selecting unit selecting a single interference-canceled signal with a least amount of residual interference from the plurality of interference-canceled signals, based on the plurality of amounts of residual interference; and
    a plurality of storage units storing outputs from the plurality of interference cancellation units while the plurality of variance detectors measure the plurality of amounts of residual interference.

6. The apparatus of claim 5, wherein each of the plurality of variance detectors comprises:
    a determining unit obtaining a plurality of digital demodulation symbols corresponding to a plurality of subcarriers of each of the plurality of interference-canceled signals, respectively;
    a measurement unit measuring differences between the plurality of subcarriers and the plurality of digital demodulation symbols; and
    an accumulator calculating a plurality of variances corresponding to the plurality of amounts of residual interference, respectively, based on the difference between the plurality of subcarriers and the plurality of digital demodulation symbols.

7. The apparatus of claim 5, wherein the output selecting unit selects the single interference-canceled signal based on an Orthogonal Frequency Division Multiplexing (OFDM) symbol unit.

* * * * *